US012681843B1

(12) United States Patent
Watkins et al.

(10) Patent No.: US 12,681,843 B1
(45) Date of Patent: Jul. 14, 2026

(54) GENERATING SOFTWARE TESTING RECOMMENDATIONS USING MACHINE LEARNING

(71) Applicant: Amazon Technologies, Inc., Seattle, WA (US)

(72) Inventors: William Christopher Watkins, Seattle, WA (US); Sean Chickosky, Clinton, MA (US); Christopher Murray Hind, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 216 days.

(21) Appl. No.: 18/600,485

(22) Filed: Mar. 8, 2024

(51) Int. Cl.
　　*G06F 11/3668* 　　(2025.01)
　　*G06F 8/71* 　　(2018.01)

(52) U.S. Cl.
　　CPC ............ *G06F 11/3688* (2013.01); *G06F 8/71* (2013.01)

(58) Field of Classification Search
　　CPC ......... G06F 11/3688; G06F 8/71; G06F 18/24
　　See application file for complete search history.

(56) References Cited

U.S. PATENT DOCUMENTS

| 2020/0310948 | A1* | 10/2020 | Culibrk | .................... | G06N 7/00 |
| 2021/0089437 | A1* | 3/2021 | Reid | .................. | G06F 11/3684 |
| 2025/0173253 | A1* | 5/2025 | Lentini | ..................... | G06T 7/70 |

OTHER PUBLICATIONS

Luca Ponzanelli et al.; Automatic Identification and Classification of Software Development Video Tutorial Fragments; IEEE; pp. 464-488; retrieved on Jan. 29, 2026 (Year: 2017).*

Yinghua Li et al.; Prioritizing test cases for deep learning-based video classifiers; Springer; 39 pages; retrieved on Jan. 29, 2026 (Year : 2024).*

* cited by examiner

*Primary Examiner* — S. Sough
*Assistant Examiner* — Cuong V Luu
(74) *Attorney, Agent, or Firm* — Kilpatrick Townsend & Stockton LLP

(57) ABSTRACT

Testing recommendations for an updated software build can be generated. For example, a computer system can determine a classification of a modification of a component of a software build into a category based on a text file that indicates the modification of the component. The computer system can also determine a recognition of an entity type for the component of the software build based on the text file. The computer system can generate, based at least in part on the classification and the recognition, a recommendation indicating one or more tests for use in testing the modification to the software build.

20 Claims, 9 Drawing Sheets

| DATE / TIME | TEXT FILE | CATEGORY | SUBCATEGORY | ENTITY TYPE | ENTITY | CATEGORY SCORE | ENTITY SCORE |
|---|---|---|---|---|---|---|---|
| FEB. 18, 2022 1:43 PM | WHEN A PLAYER DIES ON MOBILE, THEY WILL BE MISSING SEVERAL PARTS OF THE HUD AND CONTROLS SUCH AS JUMP, DODGE, ATTACK, ETC. AS WELL AS MENU ICONS | PLATFORM | MOBILE | PLAYER ACTION | TOUCH INPUT | 91.56% | 88.98% |
| | | | | | MOBILE | 91.56% | 52.57% |
| | | | | | | | |

600

700

DETERMINE A CLASSIFICATION OF A MODIFICATION OF A COMPONENT OF A SOFTWARE BUILD INTO A CATEGORY BASED ON A TEXT FILE THAT INDICATES THE MODIFICATION OF THE COMPONENT 702

DETERMINE A RECOGNITION OF AN ENTITY TYPE FOR THE COMPONENT OF THE SOFTWARE BUILD BASED AT LEAST IN PART ON THE TEXT FILE 704

GENERATE, BASED AT LEAST IN PART ON THE CLASSIFICATION AND THE RECOGNITION, A RECOMMENDATION INDICATING ONE OR MORE TESTS FOR USE IN TESTING THE MODIFICATION TO THE SOFTWARE BUILD 706

SELECT ONE OR MORE TESTS FOR A MODIFICATION TO A SOFTWARE BUILD <u>802</u>

IDENTIFY A TEST SUITE THAT INCLUDES THE SELECTED TESTS <u>804</u>

NUMBER OF TESTS > THRESHOLD PERCENTAGE? <u>806</u>

No

YES

RECOMMEND THE ONE OR MORE TESTS <u>808</u>

RECOMMEND THE TEST SUITE <u>810</u>

GENERATING SOFTWARE TESTING RECOMMENDATIONS USING MACHINE LEARNING

BACKGROUND

As the complexity of computer systems and software builds increases, the time required to debug software builds associated with computer systems often increases as well. For instance, an interaction with a single component of a software build may involve using multiple services, and each service may itself contain dependencies on numerous servers, databases, scripts, and the like. The time required to continually test and verify that components of a software build are operational may increase as the number of dependencies in the software build increases. Tests may be performed that verify whether a portion or all of the software build, such as a user interface or an application programming interface, is operational. Such tests, however, may be difficult to implement due to a number of reasons, such as inconsistent results, temporary glitches, and the like. Software builds may be managed by large development teams with a significant number of developers working in parallel, further complicating testing resource allocation. Accordingly, testing and diagnosis may require valuable resources being expended to evaluate potential problems. Further, conventional testing techniques may result in a less-than-ideal allocation of resources.

BRIEF DESCRIPTION OF THE DRAWINGS

Various embodiments in accordance with the present disclosure will be described with reference to the drawings, in which:

FIG. 7 illustrates a flow diagram of a process for generating recommendations for tests for modifications to a software build, according to at least one example;

DETAILED DESCRIPTION

Figure 1:
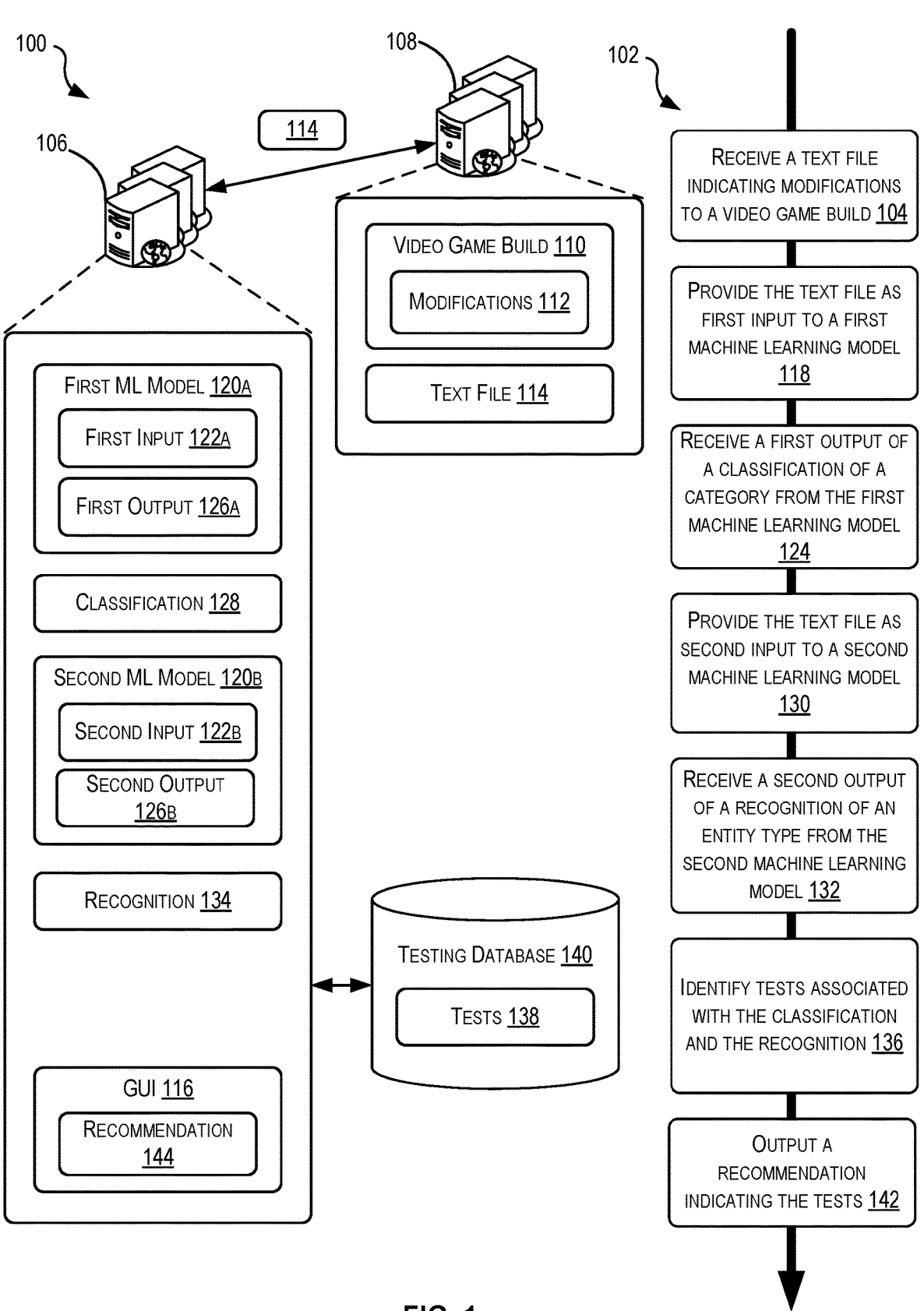
FIG. 1 illustrates a block diagram and a flowchart showing an example process for using machine learning to generate recommendations for software testing a video game build, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, generating test recommendations for modifications to a software build. A computer system can receive a text file that indicates modifications that were made in a recent update to the software build. For example, a software developer may summarize the modifications in the text file. Additionally or alternatively, the computer system may monitor modifications to code for the software build and may automatically generate a text file listing the modifications. In some examples, the computer-generated text file may be reviewed and potentially modified by a human (e.g., a software developer) before being used to generate test recommendations. The computer system can determine one or more classifications of a category for the modifications described in the text file. For example, the computer system may classify the text file as a user interface modification category (e.g., as describing various modifications to a user interface for the software build). The computer system may also determine one or more recognitions of entity types of components described as being modified in the text file. For example, the computer system can identify components (e.g., entities) of the software build, such as an interactable button in the user interface, which are described in the text file. The computer system can recognize the interactable button as an entity type of user interface elements. In some examples, the recognition and the classification can be determined using machine learning models (e.g., natural language processing models). The classification and recognition can be used by the computer system to generate a recommendation of tests to use in testing the modification to the software build. In some examples, the computer system can additionally automatically initiate (e.g., automatically execute or cause another service to automatically execute) the recommended tests on the software build.

To illustrate, consider an example of a video game build. Video game builds may be complicated software builds that may include a large number of interrelated components, which are built in parallel by multiple developers. Modifications to one component may affect multiple other components in the video game build. The cascading impact of these modifications may impact components for which a first developer has responsibility, along with components for which other developers have responsibility. It may not be feasible to test an entire video game build for each modification. Thus, it may be beneficial to identify relevant tests to use to test portions of the video game build. When a software developer generates a new feature or modifies an existing component in the video game build, the software developer may draft a text file (e.g., a change log) documenting the changes. A computer system can provide the text file as input to a first machine learning model and a second machine learning model.

Each of the machine learning models may be natural language processing (NLP) models that can be trained on historical change logs. For example, the first machine learning model can be trained to classify the contents of the text file into a category, such as relating to modifications to an art style for the video game build. In some examples, the first machine learning model may also be trained to identify subcategories for the text file. For example, the first machine learning model may identify a subcategory of art style such as character design. The second machine learning model can be trained to recognize entity types of components described in the text file. For example, the second machine learning model may identify key words in the text file (e.g., the name of a non-player character in the video game build) and may classify the key words into one of a list of predefined entity types (e.g., non-player characters).

The computer system can use the classification and the recognition to identify tests to use to test the modifications to the video game build. For example, the computer system may identify a suite of tests associated with testing design of non-player characters in the video game build. In some examples, the computer system may use keyword searching (e.g., using the classification of the category, the recognition of entity types, and/or the text file) of a testing database to identify the tests. For example, the computer system may use a third machine learning model that can generate a ranking of tests by determining relevancy scores between individual tests and the classification, recognition of entity types, and/or the text file. The most relevant tests may be output for recommendation to a change management system. In some examples, the computer system may automatically initiate execution of the recommended tests on the video game build.

Embodiments of the present disclosure provide several technological advantages over conventional methods for identifying testing for software builds. A testing database for the software build may have hundreds or thousands of tests. Manually identifying relevant tests based on change logs may be time consuming and difficult. In some cases, a single modification to the software build may require hours of testing, including identifying relevant tests. Additionally, in some cases, conventional techniques can involve a change management system that can compare the current software build to the previous software build to generate a list of changes. But understanding such a list of changes to code may require a high degree of technical aptitude as well as advanced access to the change management system. And, a list of changes generated by comparing versions of the software build may also include a significant amount of noise or irrelevant information, further complicating efforts to identify relevant tests for modifications.

In contrast, techniques described herein can produce test recommendations based solely on text files generated by software developers. Classification of category and recognition of entity types for the text file may also be included in the test recommendation. This can allow complex modification information to be easily understood regardless of technical expertise level. Additionally, time involved in testing and approving new software builds can be significantly reduced. In some examples, machine learning models used to generate classifications and recognition of entity types for the text file can additionally output confidence scores. The confidence scores can be used to prioritize testing resources and to select a queue of tests that, in some examples, may automatically be executed by the computer system. In this way, a testing pipeline can be initiated upon receipt of a text file for a new software build.

Embodiments of the present disclosure can additionally provide technical advantages over conventional methods by conserving resources. Running only the recommended set of tests on portions of the software build may conserve processing and computing resources compared to testing the entire software build after an update. Additionally, testing can be performed more efficiently. Because the computer system may be aware of interrelationships between components in the software build, the computer system may prioritize certain tests to recommend. This can include the computer system determining which tests to parallelize or whether tests should be combined (e.g., by executing or recommending that component A, component B, and component C be tested separately from component A, component B, and component C). In some examples, the computer system may also determine that rather than running a first set of tests (e.g., test A, test B, and test D) independently of a second set of tests (e.g., test A, test C, and test D), a new set of tests can be run (e.g., test A, test B, test C, and test D) to prevent repeat testing. This can also conserve computing and processing resources.

In the interest of clarity of explanation, embodiments may be described herein in connection with components of a video game build. However, the embodiments are not limited as such. Instead, the embodiments may similarly apply to any components, features, services, applications, or the like for any software build.

FIG. 1 illustrates a block diagram 100 and a flowchart showing an example process 102 for using machine learning to generate recommendations for software testing a video game build 110, according to at least one example. The diagram 100 depicts devices, objects, and the like that correspond to the process 102. The process 102 can be performed by any suitable combination of hardware and/or software as implemented by a computer system, such as computer system 106, the developer system 108, the computer system 902 of FIG. 19, or any other suitable device. The computer system 106, the developer system 108, and the computer system 902 may be any suitable combination of computing devices such as one or more server computers, which may include virtual resources, services, and the like capable of performing the functions described with respect to the computer system 106, the developer system 108, or the computer system 902. In some examples, components of the computer system 106, the developer system 108, or the computer system 902 may be distributed between a server (e.g., a cloud-based virtual instance) and a local computer.

Figure 8:
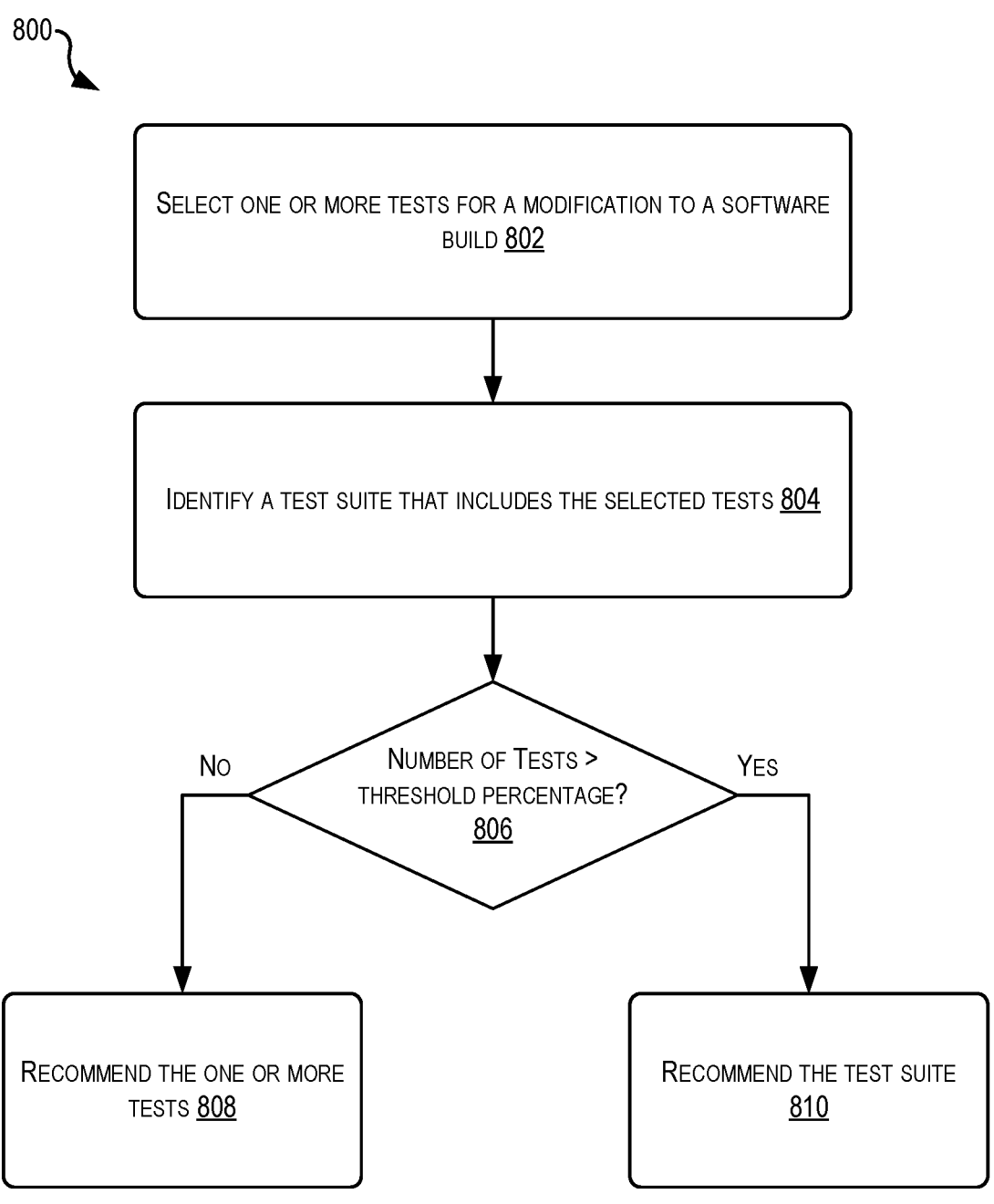
FIG. 8 illustrates a flow diagram of a process for selecting tests to recommend for modifications to a software build, according to at least one example.

FIGS. 1, 7, and 8 illustrate example flow diagrams showing processes 102, 700, and 800 according to at least a few examples. Some or all of the process 102, 700, and 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 104 by the computer system 106 receiving a text file 114 indicating one or more modifications 112 to a video game build 110. In some examples, the text file 114 may be received via a graphical user interface (GUI) 116 of the computer system 106. In other examples, the text file 114 may be received from a developer system 108 used generate the modifications 112 to the video game build 110. Additionally or alternatively, the text file 114 may be automatically generated (e.g., by the computer system 106 or the developer system 108). For example, the text file 112 may be automatically generated as a developer makes modifications to the video game build 110 via the developer system 108. Alternatively, the text file 112 may be automatically generated as a post-processing step (e.g., by comparing a previous version of the video game build to an updated version). In some examples, an automatically generated text file 112 may be reviewed and potentially modified (e.g., by a developer) before being provided as input to machine learning models as described below. In other examples, an automatically generated text file 112 may be input into machine learning models as-is without further review or modification. The text file 114 may describe the modifications 112 in a natural language format. For example, the text file 114 may include a description such as "reduced apple drops in orange loot chest." The video game build 110 may be a large, complex software build that may be frequently modified (e.g., daily or weekly). Thus, it may be beneficial to only test portions of code that are relevant to the modifications 112.

At block 118, the computer system 106 can provide the text file 114 as a first input 122a to a first machine learning model 120a (e.g., a natural language processing (NLP) model). The first machine learning model 120a can be trained to classify the words in the text file 114 into one of a set of predefined categories that the text file 114 is likely referencing. Examples of predefined categories can include a user interface category, an art style category, an audio category, an engine category, an engine category, a game service category, or a platform category for the video game build 110. The first machine learning model 120a can be trained with historical data matching the predefined categories to historical text files indicating modifications.

At block 124, the computer system 106 can receive a first output 126a of a classification of a category 128 from the first machine learning model 120a. For example, the category 128 may be a game service category. In some examples, the first output 126a may additionally include one or more subcategories classified for the category 128, such as a loot drop service. The first output 126a may, in some examples, include multiple classifications of categories and confidence scores for each category. Depending on the size and complexity of the video game build 110, the list of predefined classifications may include a relatively large number of categories. Thus, the first output 126a may be filtered to include classifications with confidence scores above a predefined threshold (e.g., 50%), or a predefined number of classifications with the highest confidence scores (e.g., the top five classifications).

At block 130, the computer system 106 can provide the text file 114 as second input 122b into a second machine learning model 120b (e.g., an NLP model). The second machine learning model 120b can be trained to identify key words describing entities (e.g., components of the video game build 110) and to classify the key words into one of a set of predefined entity types. Examples of the predefined entity types can include a card entity, a player character entity, a non-player character (NPC) entity, a gear entity, a quest entity, an event entity, or a location entity in the video game build 110. The second machine learning model 120b can be trained with historical data matching the predefined entity types to historical text files indicating modifications.

At block 130, the computer system 106 can receive a second output 126 of a recognition 134 of an entity type for components of the video game build 110 that were identified in the text file 114. For example, the second output 126 can include a weapon entity type for the component "apple." In some examples, the second output 126 can include recognition of additional entity types, such as a loot event entity type for "orange loot box." The second output 126 may also include a confidence score determined for each entity type. Thus, the second output 126b may be filtered to include entity types with confidence scores above a predefined threshold (e.g., 50%), or a predefined number of entity types with the highest confidence scores (e.g., the top five entity types).

At block 136, the computer system 106 can identify tests 138 associated with the category 128 and the recognition 134. For example, the computer system 106 can access a testing database 140 of tests 138 for the video game build 110. In some examples, the tests 138 may be tagged with key words that may correspond to the predefined set of classifications and entity types. The computer system 106 can perform keyword searching to identify tests 138 that are associated with the category 128 (e.g., loot drop service) and recognition 134 of the entity type (e.g., weapons and loot events). Thus, the computer system 106 can identify tests 138 for the loot drop service that relate to weapons dropped as part of a loot event.

At block 142, the computer system 106 can output a recommendation 144 indicating the tests 138 to use in testing the modifications 112 to the video game build 110. For example, the computer system 106 can display the recommendation 144 via the GUI 116. The computer system 106 may also display the category 128 and the recognition 134 of the entity types as well as their associated confidence scores. Alternatively or additionally, the computer system 106 can output the recommendation 144 to another computer system (e.g., developer system 108), service, tool, etc., that can execute the recommended tests 138 on the video game build 110. In some examples, the computer system 106 may automatically execute, or may cause the developer system 108 to automatically execute, the recommended tests 138 on the video game build 110. Results from executing the recommended tests 138 can be displayed on the GUI 116.

Figure 2:
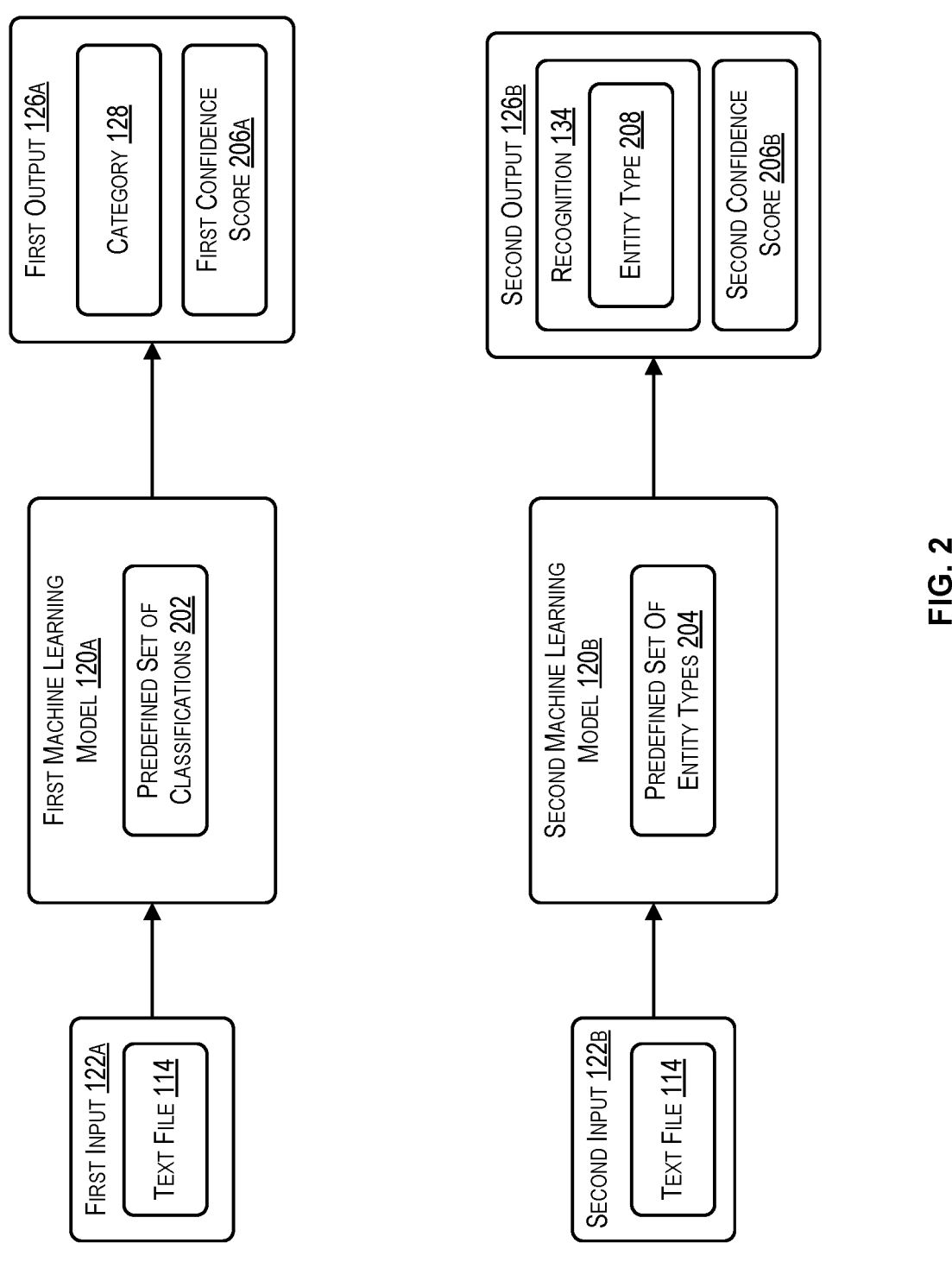
FIG. 2 illustrates a block diagram of a first machine learning model and a second machine learning model, according to at least one example.

FIG. 2 illustrates a block diagram of a first machine learning model 120a and a second machine learning model 120b, according to at least one example. The machine learning models 120a-b may be natural language processing (NLP) models that are trained to categorize or classify text input. The machine learning models 120a-b may be executed in parallel (e.g., by computer system 106 of FIG. 1) to generate outputs 126a-b that are used to determine test recommendations for a software build. The first machine learning model 120a can be trained on a predefined set of classifications 202 for the software build. The predefined set of classifications 202 can include a category of features for the software build. The second machine learning model 120b can be trained on a predefined set of entity types 204 of entity types for the software build. The historical data for the machine learning models 120a-b can include historical text files describing modifications that are matched to labels (e.g., the predefined set of classifications 202 and the predefined set of entity types 204).

The first machine learning model 120a and the second machine learning model 120b can each receive a text file 114 (e.g., as a first input 122a and a second input 122b, respectively) indicating modifications to the software build. In some examples, the text file 114 may be a plaintext file describing the modifications. In other examples, the text file 114 may include embedded links for a word or phrase in the text file 114 that may link to a database or webpage with additional information for the word or phrase. The machine learning models 120a-b may additionally be trained with the text in the database or webpage. The descriptions of modifications in the text file 114 may be in any format, such as in full sentences, sentence fragments, lists, etc.

The first machine learning model 120a can use the first input 122a to generate a first output 126a that classifies the text file 114 into one or more of the predefined set of classifications 202 (e.g., a category 128). The category 128 can be a classification of an overall feature of the software build that was described as being modified in the text file 114, as opposed to a recognition of individual words or phrases within the text file 114. The first output 126*a* may additionally include a first confidence score 206*a* indicating a level of confidence in the category 128 or a level of similarity between the text file 114 and the category 128.

The second machine learning model 120*b* can use the second input 122*b* to generate a second output 126*b* that classifies key words or phrases detected in the text file 114. For example, the second machine learning model 120*b* can identify a key word (e.g., an entity type) and can classify the key word into one or more of the predefined set of entity types 204 to generate a second output 126*b* (e.g., a recognition 134 of the entity type 208). The entity type can be a recognition of any component in the software build. For example, in a video game build, a component may be an in-game character or object. The component may also be an event, a location, a level, etc. In other examples, a component may be a virtual object such as a container or virtual machine in a computing environment. The second output 126*b* may also include a second confidence score 206*b* indicating a level of confidence in the recognition 134 or a level of similarity between the entity type 208 and the key word or phrase (e.g., component) identified in the text file 114.

It may be beneficial to generate both classifications of categories 128 and recognitions 134 of entity types 208 for the modification to the software build to use in identifying tests. In some examples, determining only a category 128 (e.g., an audio categorization) of the entire text file 114 or only a recognition 134 of an entity type 208 (e.g., a quest event) in the text file 114 may not produce enough information to narrow down potential tests for the modification to the software build. For example, there may be many aspects to a quest event or to game audio that can be tested in a video game build. But there may be significantly less tests used to test audio for the quest event.

Figure 3:
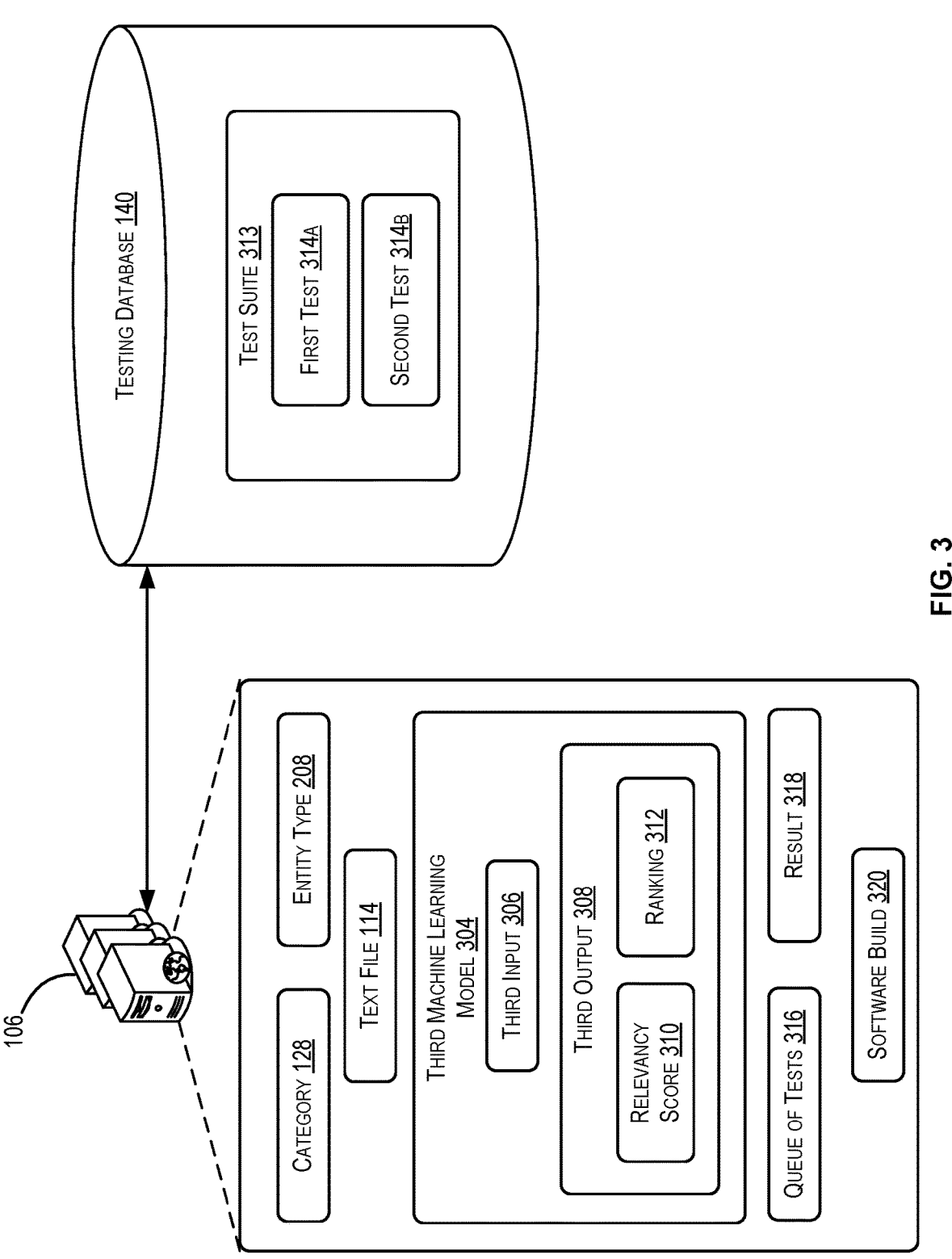
FIG. 3 illustrates a block diagram of a computer system that can recommend tests for modifications to a software build, according to at least one example.

FIG. 3 illustrates a block diagram of a computer system 106 that can recommend tests for modifications to a software build 320, according to at least one example. The computer system 106 can receive a text file 114 describing modifications to the software build 320 and can generate a classification of a category 128 of the modifications described in the text file and a recognition 134 of an entity type 208 described in the text file as being modified. The computer system 106 can be communicatively coupled to a testing database 140.

The testing database 140 can include tests 314*a-b* used to test various aspects of the software build 320. Depending on the size or complexity of the software build 320, the testing database 140 may include hundreds or thousands of tests 314*a-b*. In some examples, the testing database 140 can include test suites 313 that can include multiple tests (e.g., first test 314*a* and second test 314*b*) that, in some examples, are to be performed in a particular order. For example, the software build 320 may first be tested with the first test 314*a* may be tested first. Depending on the results of the first test 314*a*, the software build 320 may or may not be tested with the second test 314*b* (or any other test in the test suite 313). In some examples, the tests 314*a-b* may be associated with key words or phrases (e.g., as metadata, tagging, labeling, etc.) that correspond to the set of predefined classifications and the set of predefined entity types. A test suite 313 may be designed to test a particular feature of a software build (e.g., a component of a video game build). For example, test suites may be designed to test software functions relating to logins for a mobile application or any other suitable component of a software build.

The computer system 106 may include a third machine learning model 304 that can be used to identify tests for the modification to the software build 320. The third machine learning model 304 may use a ranking algorithm to generate rankings of the tests 314*a-b* in the testing database 140. For example, the computer system 106 can provide at least one of the classification of the category 128, the recognition of the entity type 208, or the text file 114 as a third input 306 to the third machine learning model 304. The third machine learning model 304 can perform vector embedding to generate a relevancy score 310 between the third input 306 and each test 314 in the testing database 140 (e.g., using the tags, metadata, labels, etc. for the tests 314). The relevancy scores 310 for the tests 314*a-b* can be used to generate a ranking 312 of the tests 314*a-b*. The tests 314 with the highest relevancy scores can be higher in the ranking 312. The computer system 106 can receive the relevancy scores 310 and ranking 312 as a third output 308 from the third machine learning model 304.

The computer system 106 may select one or more tests 314 to recommend based on the ranking 312. For example, the computer system 106 may select tests 314 to recommend for the software build 320 that have a relevancy score 310 that is above a predefined threshold. In some examples, the computer system 106 may recommend an entire test suite 313 of tests 314 if more than a threshold percentage of tests 314 in the test suite 313 (e.g., 70%) have relevancy scores 310 above the predefined threshold. The computer system 106 can build a queue of tests 316 that are recommended or, in some examples, automatically executed by the computer system 106. For example, the computer system 106 may automatically execute a queue of tests 316 with relevancy scores 310 above a predefined threshold, or when the category 128 and/or recognition 134 have confidence scores above a predefined threshold.

In some examples, the queue of tests 316 may be updated based on a result 318 of a test that is automatically executed by the computer system 106 or by any other computer system. For example, the computer system 106 may detect that a first test 314*a* in the queue of tests 316 has been executed. The first test 314*a* can then be removed from the queue of tests 316. In some examples, the result of a test may affect the queue of tests 316. For example, the computer system 106 may determine that a second test 314*b* in the queue of tests 316 has generated a fail result (e.g., for a pass or fail tests). Because the second test 314*b* failed, the computer system 106 may alter a next test in the queue of tests 316 (e.g., by selecting a third test to add to the queue, or removing a third test from the queue, or any other suitable operation).

In some examples, the computer system 106 may determine that none of the tests 314 in the testing database 140 have a relevancy score 310 that exceeds the predefined threshold. Thus, no test 314 may be selected for the recommendation. Instead, the computer system 106 may generate a recommendation to generate a test associated with the text file 114 and/or the category 128 and the recognition 134 of the entity type.

Figure 4:
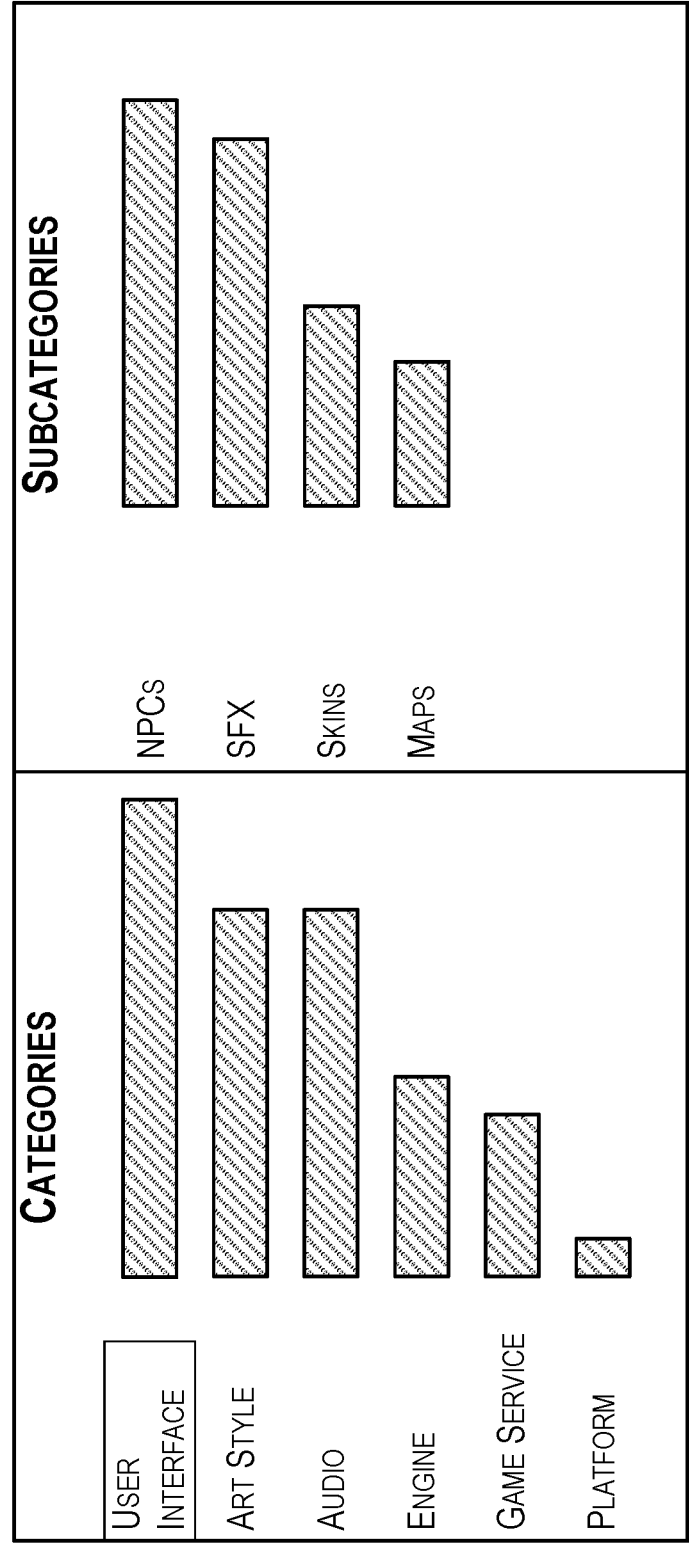
FIG. 4 illustrates a graphical user interface (GUI) displaying categories and subcategories identified for modifications to a software build, according to at least one example.

FIG. 4 illustrates a graphical user interface (GUI) 400 displaying categories and subcategories identified for modifications to a software build, according to at least one example. In the example depicted in FIG. 4, the GUI 400 can depict categories and associated subcategories determined for modifications of a video game build. In some examples, the categories and subcategories can be generated using a machine learning model (e.g., the first machine learning model 120*a* of FIGS. 1-2).

Each category displayed on the GUI 400 can have an associated value (e.g., depicted in FIG. 4 as a bar). The value may be a predicted number of modifications in the associated category that the first machine learning model 120*a* detected in a text file describing the modifications. In some examples, the value may be a confidence score or a relevancy score between the text file and the associated category, or any other metric used in categorizing the modifications described in the text file. Each category may be associated with one or more subcategories that may also be generated by the first machine learning model 120*a*. The subcategories can be displayed when the GUI 400 registers a selection of one of the categories. For example, the User Interface category can be selected, and in response the GUI 400 can display the NPCs, SFX, Skins, and Maps subcategories for the User Interface category. Each of the subcategories may have an associated value indicating a metric used in generating the subcategory for the modification.

Figure 5:
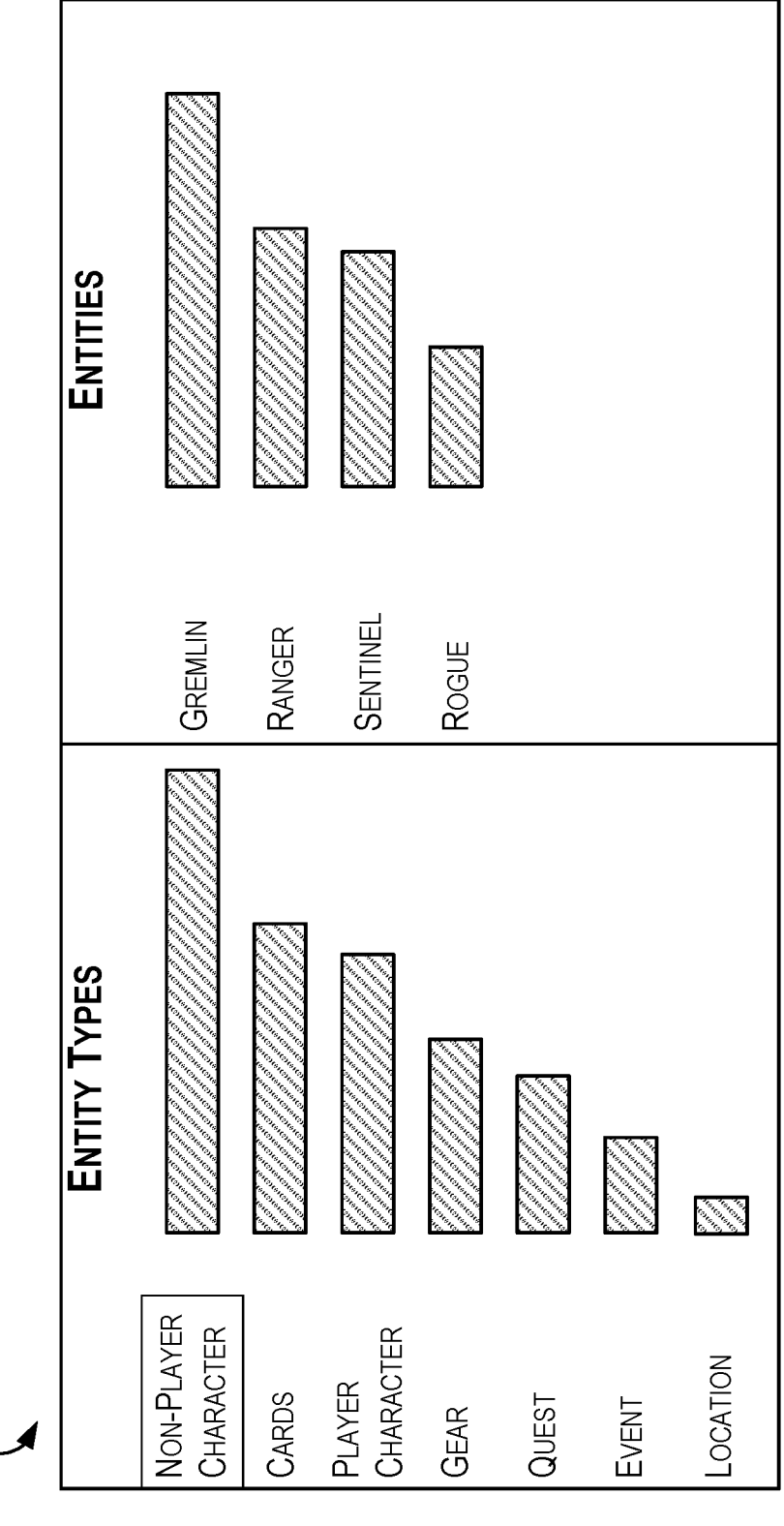
FIG. 5 illustrates a GUI displaying entity types and entities identified for modifications to a software build, according to at least one example.

In some examples, the categories and subcategories may be displayed via the GUI 400 in addition to a recommendation for tests to execute based on the categories and subcategories. Displaying the categories and subcategories via the GUI 400 can provide an opportunity to identify incorrect or inaccurate classification by the first machine learning model 120*a*. For example, the GUI 400 may include interactable elements allowing a user to select a correction to a classification for the text file. In response, a computer system (e.g., the computer system 106 of FIGS. 1-3) can update a training dataset used to train the first machine learning model 120*a*. FIG. 5 illustrates a GUI 500 displaying entity types and entities identified for modifications to a software build, according to at least one example. In the example depicted in FIG. 5, the GUI 500 can depict entity types and associated entities identified from a text file describing modifications to a video game build. In some examples, the entity types and entities can be generated using a machine learning model (e.g., the second machine learning model 120*b* of FIGS. 1-2).

Each entity type displayed on the GUI 500 can have an associated value (e.g., depicted in FIG. 5 as a bar). The value may be a predicted number of modifications made to entities of the entity type in the video game build, as generated by the second machine learning model 120*b* based on the text file describing the modifications. Each entity type can be associated with one or more entities that may also be generated by the second machine learning model 120*b*. The entities can be displayed when the GUI 500 registers a selection of one of the entity types. For example, the non-player character entity type can be selected, and in response the GUI 500 can display the Gremlin, Ranger, Sentinel, and Rogue entities for the non-player character entity type. Each of the entities may have an associated value indicating a predicted number of modifications made to that entity in the video game build.

In some examples, the entity types and entities may be displayed via the GUI 500 in addition to a recommendation for test to execute based on the entity types and entities. Displaying the entity types and entities via the GUI 500 can provide an opportunity to identify incorrect or inaccurate recognition by the second machine learning model 120*b*. For example, the GUI 500 may include interactable elements allowing a user to select a correction to a recognition for the text file. For example, a Food entity type may include an associated Apple entity. In this particular video game build, apples may be used as weapons rather than food. Thus, based on the GUI 500, a tester may enter a correction to relabel the Apple entity as a Weapon entity type. The computer system 106 can then re-train the second machine learning model 120*b* with the relabeled Apple entity.

Figure 6:
FIG. 6 illustrates a GUI displaying confidence scores for classifications and recognitions of entity types of modifications to a software build, according to at least one example.

FIG. 6 illustrates a GUI 600 displaying confidence scores for classifications and recognitions of entity types for modifications to a software build, according to at least one example. The classifications of category, entity types, and associated confidence scores may be generated by machine learning models (e.g., the machine learning models 120*a-b* of FIGS. 1-2). The GUI 600 depicted in FIG. 6 displays the top (e.g., having the highest confidence score) category, subcategory, entity type, and entities for a text file that describes a modification to a video game build. In some examples, as depicted in FIG. 6, the text file may describe an issue that was resolved (e.g., missing controls when a player dies on mobile) via the modifications. For this text file, the first machine learning model 120*a* used natural language processing to generate a category of Platform with a confidence score of 91.56% and a subcategory of Mobile Platform. The second machine learning model 120*b* used natural language processing to generate an entity type of Player Action as well as entities of Touch Input (having a confidence score of 88.98%) and Mobile (having a confidence score of 52.57%).

The classifications, entity types, and confidence scores can be output for display to a user to aid in selecting tests for the modification or in providing additional context related to the recommended tests generated by the computer system 106 that, in some examples, are automatically executed by the computer system 106.

FIG. 7 illustrates a flow diagram of a process 700 for generating recommendations for tests for modifications to a software build, according to at least one example. In some examples, the computer system 106 of FIG. 1 or the computer system 902 of FIG. 9 may perform some or all parts of the process 700.

The process 700 begins at block 702 by determining a classification of a category of a modification of a component of a software build based on a text file that indicates the modification of the component. For example, a computer system can provide the text file as a first input to a first machine learning model that can generate a first output based at least in part on the first input. The first output can include the classification of the modification of the component. The first output may additionally include a first predicted number of modifications in the category for the software build. In some examples, the first machine learning model can generate a first confidence score for the classification. The first output can additionally include the first confidence score. In some examples, the computer system may identify multiple classifications for the text file. The first output can include classifications with confidence scores that exceed a predefined threshold. The computer system can receive the first output from the first machine learning model.

At block 704, the process 700 can involve determining a recognition of an entity type for the component of the software build based at least in part on the text file. For example, the computer system can provide the text file as a second input to a second machine learning model that can generate a second output based at least in part on the second input. The second input can include a recognition of the entity type for the component of the software build. The second input may additionally include a second predicted number of modifications for the entity type in the software build.

In some examples, the second machine learning model can generate the second output by identifying the component referenced in the text file. Then, the second machine learning model can select, from a list of predefined entity types, the entity types that is associated with the component. In some examples, the second machine learning model can generate a second confidence score for an association between the component and the recognition of the entity type. The second output can additionally include the second confidence score. In some examples, the second machine learning model can identify multiple entity types from the text file. The second output may include entity types with confidence scores that exceed a predefined threshold. In some examples, the second output may include an entity type with a highest confidence score. The computer system can receive the second output from the second machine learning model.

At block 706, the process 700 can involve generating, based at least in part on the classification and the recognition, a recommendation indicating one or more tests for use in testing the modification to the software build. For example, the computer system may provide the entity type the classification, and/or the text file as a third input to a third machine learning model. The third machine learning model can generate, based at least in part on the third input, a third output that includes a ranking of tests from a testing database. The ranking can be generated according to a relevancy score determined between the entity type and each test in the ranking (e.g., in the testing database). The computer system can select the one or more tests for the recommendation based on the one or more tests having a relevancy score that exceeds a predefined threshold (e.g., 80%).

In some examples, the computer system may determine that none of the tests in the testing database have a relevancy score that exceeds the predefined threshold. This may indicate that there is no relevant test for the combination of the classification and the entity type generated by the machine learning models. Thus, in response, the computer system can generate a recommendation to generate a test associated with the text file and/or the classification and the entity type.

In some examples, the computer system can automatically initiate the one or more tests of the recommendation. For example, the computer system may automatically execute the one or more tests in response to determining that a confidence score for the classification or recognition of entity types associated with the one or more tests exceeds a predefined threshold. Or the computer system may automatically execute the one or more tests in response to determining that a relevancy score for the one or more tests exceeds a predefined threshold. Automatically executing the one or more tests on the software build may generate a result for the one or more tests.

In some examples, the computer system may determine, based at least in part on the classification and the recognition of the entity type, a queue of tests from the testing database for the recommendation. The computer system can detect that a first test from the queue of tests has been executed, and in response, can remove the first test from the queue of tests. In some examples, the computer system can determine that a second test from the queue of tests has generated a fail result. In response, the compute system can select a third test from the testing database to add to the queue of tests in response to determining that the second test has generated the fail result.

The computer system can output, via a graphical user interface, the result for the one or more tests. In some examples, the computer system may also display, via the graphical user interface, the classification, the recognition of the entity type, the recommendation indicating the one or more tests, the first confidence score generated by the first machine learning model for the classification, and the second confidence score generated by the second machine learning model for the recognition for the entity type.

FIG. 8 illustrates a flow diagram of a process 800 for selecting tests to recommend for modifications to a software build, according to at least one example. In some examples, the computer system 106 of FIG. 1 or the computer system 902 of FIG. 9 may perform some or all parts of the process 800.

The process 800 can begin at block 802, where the computer system can select one or more tests to test a modification of a software build. In some examples, the computer system may select the one or more tests from a testing database based on relevancy scores for the one or more tests (e.g., as determined by a ranking model such as the third machine learning model 304 of FIG. 3). For example, each of the selected tests may have a relevancy score above a predefined threshold (e.g., 60%). The relevancy score may indicate a level of similarity between tags for the selected tests and a classification and/or a recognition of an entity type for a text file describing the modification to the software build.

At block 804, the computer system can identify a test suite in the testing database that includes one or more of the selected tests. A test suite can be a group of tests that are to be tested together (e.g., in a particular sequence) to test a particular feature of the software build. In some examples, a result of a test in the test suite may affect which test is to be used next. For example, if a first test passes, then a second test may be executed next. But if the first test fails, then a third test may be executed next instead. If multiple tests selected by the computer system are included in a test suite, this may indicate that it may be beneficial to test the entire test suite.

At block 806, the computer system can determine if a number of selected tests in the test suite exceeds a number of tests that is a threshold percentage (e.g., 20%) of tests in the test suite. For example, the test suite may include ten tests, and the number of tests that is a threshold percentage can be two tests. If the number of selected tests in the test suite does not exceed the threshold percentage, the process 800 can continue to block 808. If the number of selected tests in the test suite does not exceed the threshold percentage, the process 800 can continue to block 810.

At block 808, the computer system can recommend the selected one or more tests to be used in testing the modification to the software build. That is, only the one or more tests selected as having relevancy scores above the predefined threshold may be included in a recommendation. Tests in the test suite that do not include the selected tests may not be included in the recommendation. In some examples, such as when the relevancy scores for the selected tests exceed a predefined threshold, the computer system may automatically initiate the recommended tests.

At block 810, the computer system can recommend the entire test suite to be used in testing the modification to the software build. Thus, the recommendation can include tests in the test suite that were not previously identified by the computer system as having a relevancy score that exceeds the predefined threshold. In some examples, such as when the relevancy scores for the selected tests exceed a predefined threshold, the computer system may automatically initiate the recommended tests.

Figure 9:
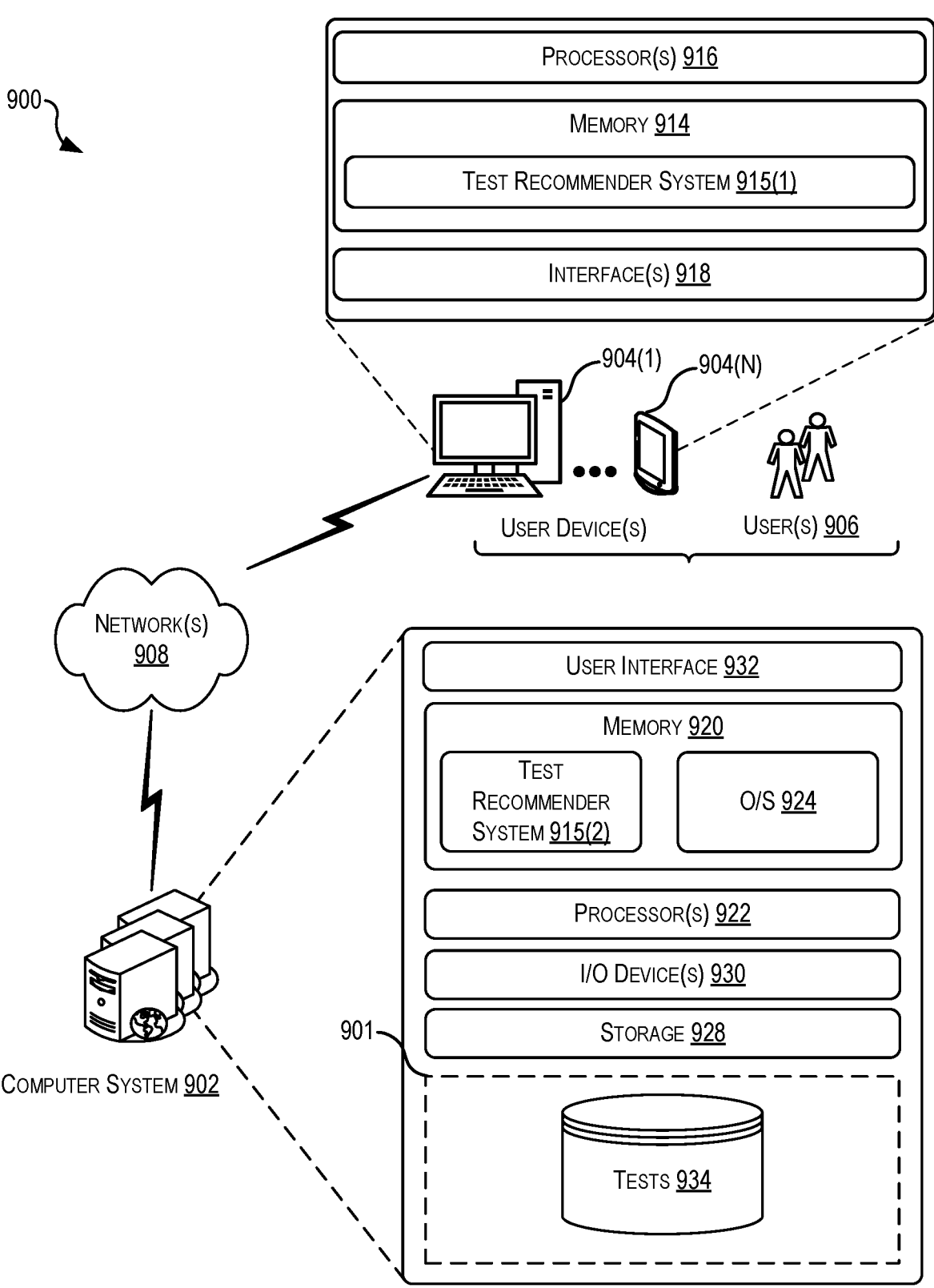
FIG. 9 illustrates an environment in which various embodiments can be implemented.

FIG. 9 illustrates aspects of an example environment 900 for implementing aspects in accordance with various embodiments. The environment 900 may include a computer system 902 (e.g., the computer system 106 and/or developer system 108 described herein) in communication with one or more user devices 904(1)-904(N) via one or more networks 908 (hereinafter, "the network 908").

The user device 904 may be operable by one or more users 906 to interact with the computer system 902. The user device 904 may be any suitable type of computing device such as, but not limited to, a tablet, a mobile phone, a smart phone, a network-enabled streaming device (a high-definition multimedia interface ("HDMI") micro-console plug-gable device), a personal digital assistant ("PDA"), an onboard computer, a tablet computer, etc. For example, the user device 904(1) is illustrated as a desktop computer, while the user device 904(N) is illustrated as an example of a handheld mobile device.

The user device 904 may include a memory 914 and processor(s) 916. In the memory 914 may be stored program instructions that are loadable and executable on the processor(s) 916, as well as data generated during the execution of these programs. Depending on the configuration and type of user device 904, the memory 914 may be volatile (such as random access memory ("RAM")) and/or non-volatile (such as read-only memory (ROM), flash memory, etc.).

In some examples, the memory 914 may include a version of a test recommender system 915 (e.g., the test recommender system 915(1)). The test recommender system 915(1) may allow the user 906 to interact with the computer system 902 via the network 908. The user device 904 may also include one or more interfaces 918 to enable communication with other devices, systems, and the like. The test recommender system 915(1), whether embodied in the user device 904 or the computer system 902, may be configured to perform the techniques described herein. For example, the test recommender system 915(1) can use machine learning models (e.g., first machine learning model 120a and second machine learning model 120b) to generate classifications and/or recognitions of entity types of a text file describing modifications to a software build. The test recommender system 915(1) may also use machine learning models (e.g., third machine learning model 304 of FIG. 4) to generate recommendations for selected tests to execute to test the modifications to the software build. In an example, the test recommender system(1) can include any other suitable devices, engines, modules, models, and the like.

Turning now to the details of the computer system 902, the computer system 902 may include one or more computer system computers, perhaps arranged in a cluster of servers or as a server farm, and may host web service applications. The function of the computer system 902 may be implemented a cloud-based environment such that individual components of the computer system 902 are virtual resources in a distributed environment.

The computer system 902 may include at least one memory 920 and one or more processing units (or processor(s)) 922. The processor 922 may be implemented as appropriate in hardware, computer-executable instructions, software, firmware, or combinations thereof. Computer-executable instruction, software, or firmware implementations of the processor 922 may include computer-executable or machine-executable instructions written in any suitable programming language to perform the various functions described. The memory 920 may include more than one memory and may be distributed throughout the computer system 902. The memory 920 may store program instructions that are loadable and executable on the processor(s) 922, as well as data generated during the execution of these programs. Depending on the configuration and type of memory including the computer system 902, the memory 920 may be volatile (such as RAM and/or non-volatile (such as read-only memory ("ROM"), flash memory, or other memory)). The memory 920 may include an operating system 924 and one or more application programs, modules, or services for implementing the features disclosed herein including at least a version of the test recommender system 915 (e.g., 915(2)). For example, the test recommender system 915(2) may perform the functionality described herein.

The computer system 902 may also include additional storage 928, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 928, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 902 and/or part of the computer system 106 or developer system 108.

The computer system 902 may also include input/output (I/O) device(s) and/or ports 930, such as for enabling connection with a keyboard, a mouse, a pen, a voice input device, a touch input device, a display, speakers, a printer, or other I/O device.

In some examples, the computer system 902 may also include one or more user interface(s) 932. The user interface 932 may be utilized by an operator, curator, or other authorized user to access portions of the computer system 902. In some examples, the user interface 932 may include a graphical user interface, voice interfaces, web-based applications, programmatic interfaces such as APIs, or other user interface configurations.

The computer system 902 may also include a data store 901. In some examples, the data store 901 may include one or more databases, data structures, or the like for storing and/or retaining information associated with the computer system 902. The test recommender system 915 is communicatively coupled (e.g., via a wired connection or a wireless connection) to the data store 901. The data store 901 includes tests 934 used to tests software builds. In an example, the data store 901 can include any other suitable data, databases, libraries, and the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:
a processing device; and
a non-transitory memory that stores instructions that are executable by the processing device for causing the processing device to at least:

receive a text file indicating one or more modifications to a video game build;
provide the text file as a first input to a first machine learning model configured to generate, based at least in part on the first input, a first output comprising a classification of the one or more modifications to the video game build into a category;
receive, from the first machine learning model, the first output;
provide the text file as a second input to a second machine learning model configured to, based at least in part on the second input, identify a component of the video game build in the text file and generate a second output comprising a recognition of an entity type for the component;
receive, from the second machine learning model, the second output;
identify one or more tests from a testing database, wherein the one or more tests are associated with the classification of the one or more modifications or the recognition of the entity type;
output a recommendation indicating the one or more tests to use in testing the one or more modifications to the video game build; and
automatically execute, based at least in part on the recommendation, the one or more tests for testing the one or more modifications to the video game build.

2. The computer system of claim 1, wherein the non-transitory memory further stores instructions that are executable by the processing device for causing the processing device to at least:
generate a result for the one or more tests based at least in part on automatically executing the one or more tests.

3. The computer system of claim 1, wherein the classification comprises one of a plurality of predefined categories including a user interface category, an art style category, an audio category, an engine category, a game service category, or a platform category for the video game build.

4. The computer system of claim 1, wherein the recognition comprises one of a plurality of predefined entity types including a card entity, a player character entity, a non-player character entity, a gear entity, a quest entity, an event entity, or a location entity in the video game build.

5. A computer-implemented method, comprising:
determining a classification of a modification of a component of a software build into a category based on a text file that indicates the modification of the component;
determining a recognition of an entity type for the component of the software build based on the text file;
generating, based at least in part on the classification and the recognition, a recommendation indicating one or more tests for use in testing the modification to the software build; and
automatically executing, based at least in part on the recommendation, the one or more tests for testing the modification to the software build.

6. The computer-implemented method of claim 5, wherein determining the classification and determining the recognition further comprises:
providing the text file as a first input to a first machine learning model configured to generate, based at least in part on the first input, a first output comprising the classification of the modification of the component;
providing the text file as a second input to a second machine learning model configured to generate, based at least in part on the second input, a second output comprising the recognition of the entity type for the component of the software build; and receiving the first output from the first machine learning model and the second output from the second machine learning model.

7. The computer-implemented method of claim 6, wherein the second machine learning model is further configured to generate the second output by:

identifying the component referenced in the text file; and selecting, from a list of predefined entity types, the entity type that is associated with the component.

8. The computer-implemented method of claim 6, wherein the first machine learning model is further configured to generate a first confidence score for the classification, and wherein the second machine learning model is further configured to generate a second confidence score for the recognition.

9. The computer-implemented method of claim 8, further comprising:

determining that the first confidence score and the second confidence score each exceed a predefined threshold, and wherein automatically executing the one or more tests is responsive to determining that the first confidence score and the second confidence score each exceed the predefined threshold.

10. The computer-implemented method of claim 6, wherein the first output generated by the first machine learning model further comprises a first predicted number of modifications in the classification for the software build, and wherein the second output generated by the second machine learning model further comprises a second predicted number of modifications for the entity type in the software build.

11. The computer-implemented method of claim 5, wherein generating the recommendation indicating the one or more tests further comprises:

providing at least one of the entity type, the classification, or the text file as a third input to a third machine learning model configured to generate, based at least in part on the third input, a third output comprising a ranking of tests from a testing database according to a relevancy score determined between the entity type and each test in the ranking of tests; and selecting the one or more tests for the recommendation based on the one or more tests having a relevancy score that exceeds a predefined threshold.

12. The computer-implemented method of claim 11, further comprising:

determining that none of the tests in the testing database have a relevancy score that exceeds the predefined threshold; and generating another recommendation to generate a test associated with the classification or the text file in response to determining that none of the tests have the relevancy score that exceeds the predefined threshold.

13. The computer-implemented method of claim 5, further comprising:

determining, based at least in part on the classification and the recognition, a queue of tests from a testing database for the recommendation;

detecting that a first test from the queue of tests has been executed; and removing the first test from the queue of tests.

14. The computer-implemented method of claim 13, further comprising:

determining that a second test from the queue of tests has generated a fail result; and selecting a third test to add to the queue of tests in response to determining that the second test has generated the fail result.

15. The computer-implemented method of claim 5, further comprising:

identifying a test suite comprising a plurality of tests in a testing database, the test suite including the one or more tests;

determining that the one or more tests exceed a threshold percentage of the plurality of tests in the test suite; and generating the recommendation indicating each test of the plurality of tests in the test suite responsive to determining that the one or more tests exceed the threshold percentage.

16. The computer-implemented method of claim 15, further comprising:

determining that the one or more tests do not exceed the threshold percentage of the plurality of tests in the test suite; and generating the recommendation indicating the one or more tests responsive to determining that the one or more tests do not exceed the threshold percentage, wherein the recommendation does not comprise each test of the plurality of tests in the test suite.

17. One or more non-transitory computer-readable media comprising computer-executable instructions that, when executed by one or more processing devices of a computer system, cause the computer system to perform operations comprising:

determining a classification of one or more modifications of a component of a software build into a category based on a text file that indicates the one or more modifications of the component;

determining a recognition of an entity type for the component of the software build based at least in part on the text file;

generating, based at least in part on the classification and the recognition, a recommendation indicating one or more tests for use in testing the one or more modifications to the software build; and automatically executing, based at least in part on the recommendation, the one or more tests for use in testing the one or more modifications to the software build.

18. The one or more non-transitory computer-readable media of claim 17, wherein the operations further comprise:

generating a result for the one or more tests based at least in part on automatically executing the one or more tests.

19. The one or more non-transitory computer-readable media of claim 17, wherein the computer-executable instructions, when executed by the one or more processing devices of the computer system, further cause the computer system to perform the operations comprising:

identifying the component referenced in the text file;

generating a confidence score for an association between the component and each entity type of a list of predefined entity types; and selecting the entity type from the list of predefined entity types by determining a highest confidence score.

20. The one or more non-transitory computer-readable media of claim 17, wherein a first machine learning model is configured to generate the classification and a second machine learning model is configured to generate the recognition, and wherein the operations further comprise:

receiving the text file via a graphical user interface; and displaying, via the graphical user interface, the classification, the recognition of the entity type, the recommendation indicating the one or more tests, a first confidence score generated by the first machine learning model for the classification, and a second confidence score generated by the second machine learning model for the recognition of the entity type.

* * * * *